(12) United States Patent
Uhr et al.

(10) Patent No.: US 10,528,756 B2
(45) Date of Patent: Jan. 7, 2020

(54) METHOD FOR MANAGING INFORMATION USING TREE STRUCTURE BASED ON BLOCKCHAIN, SERVER AND TERMINAL USING THE SAME

(71) Applicant: Coinplug, Inc., Seongnam-si (KR)

(72) Inventors: Joon Sun Uhr, Seongnam-si (KR); Jay Wu Hong, Seoul (KR); Joo Han Song, Seongnam-si (KR); Moon Gju Suh, Seoul (KR)

(73) Assignee: COINPLUG, INC., Seongnam-si (KR)

( * ) Notice: Subject to any disclaimer, the term of this patent is extended or adjusted under 35 U.S.C. 154(b) by 0 days.

(21) Appl. No.: 16/268,885

(22) Filed: Feb. 6, 2019

(65) Prior Publication Data

US 2019/0243986 A1 Aug. 8, 2019

(51) Int. Cl.
*G06F 21/62* (2013.01)
*H04L 9/06* (2006.01)

(52) U.S. Cl.
CPC ...... *G06F 21/6227* (2013.01); *G06F 21/6245* (2013.01); *H04L 9/0643* (2013.01); *H04L 2209/38* (2013.01)

(58) Field of Classification Search
CPC ............ G06F 21/6227; G06F 21/6245; H04L 9/0643; H04L 2209/38
See application file for complete search history.

(56) References Cited

U.S. PATENT DOCUMENTS

| | | | |
|---|---|---|---|
| 2017/0033932 A1* | 2/2017 | Truu | H04L 9/3247 |
| 2018/0117447 A1* | 5/2018 | Tran | A63B 71/145 |
| 2018/0121909 A1* | 5/2018 | Christidis | G06Q 20/383 |
| 2018/0309567 A1* | 10/2018 | Wooden | H04L 9/06 |
| 2019/0103973 A1* | 4/2019 | Chalkias | G06Q 20/381 |
| 2019/0140819 A1* | 5/2019 | Dolev | H04L 9/321 |
| 2019/0228386 A1* | 7/2019 | Onnainty | G06Q 20/065 |

\* cited by examiner

*Primary Examiner* — Techane Gergiso
(74) *Attorney, Agent, or Firm* — Xsensus, LLP (57) ABSTRACT

A method, user device, and service providing server are provided for information management using a specific tree based on a blockchain. Aspects of the described approach include registering in an open ledger of the blockchain private data that belongs to a set of private data that identifies a particular subject. Furthermore, pseudo-public data including prefix values that correspond to specific private data are generated, registered as sub-data corresponding to a sub-structure of a specific leaf node to which the specific private data is allocated. Also, a pseudo-public function is created based on the pseudo-public data allocated to the specific leaf node.

16 Claims, 5 Drawing Sheets

METHOD FOR MANAGING INFORMATION USING TREE STRUCTURE BASED ON BLOCKCHAIN, SERVER AND TERMINAL USING THE SAME

CROSS-REFERENCE TO RELATED APPLICATIONS

This application claims the benefit of priority of the Korean Patent Application No. 10-2018-0014749 filed with the Korean State Intellectual Property Office on Feb. 6, 2018, the entire disclosure of which is incorporated herein by reference.

FIELD OF THE DISCLOSURE

The present disclosure relates to a method for information management using a tree structure based on a blockchain.

BACKGROUND OF THE DISCLOSURE

Personal information refers to information that can identify each individual directly or indirectly among information about the individual. The personal information is at the center of a conflict between protection of privacy of the individual and collection and use of the personal information for marketing of a company, and thus a risk of infringement of the privacy is increasing accordingly.

Recently, IoT (Internet of Things) devices have been commercialized, and the risk of infringement of individual information of the IoT devices corresponding to the individual's personal information is also increasing.

In addition, if private data of users such as the personal information and the individual information of the IoT devices are collected in a centralized manner and stored in a database, the risk of infringement or leakage of the personal information by the company on purpose or due to its mistakes will not disappear. Therefore, there is a need for a method for preventing wide exposure of the private data of subjects.

In order to solve the problem of the centralized data collection, a method of managing information by using a blockchain technology with security and stability is emerging.

The blockchain uses a distributed ledger that allows a large number of participants to manage a series of synchronized ledgers jointly. Although there is no risk of hacking or the like, since data of the distributed ledger is open to all of the participants, the private data is encrypted, for example, converted into a hash value, and registered in the distributed ledger.

However, in a conventional method of registering and managing the private data of a subject, e.g., the user or a user device, in the distributed ledger of the blockchain, a hash value of the entire private data of the subject is registered in the distributed ledger, and in order to confirm authenticity of the subject's private data, a hash value of a presented private data for comparison and the hash value registered in the distributed ledger are compared, to thereby confirm whether the presented private data for comparison is authentic, that is, whether the subject has permission.

Therefore, if there are a plurality of pieces of the private data of the subject, it is necessary to present all the private data registered in the distributed ledger so as to confirm the authenticity using the hash value. Therefore, the private data are disclosed unnecessarily and the risk of exposure of the private data is increased accordingly.

SUMMARY OF THE DISCLOSURE

It is an object of the present disclosure to solve all the aforementioned problems.

It is another object of the present disclosure to manage private data of a subject using highly secure blockchain technology.

It is another object of the present disclosure to confirm the subject using only individual private data among the private data.

It is still another object of the present disclosure to minimize exposure of the private data to be used for confirming the subject.

It is still yet another object of the present disclosure to allow part of the private data to be used for confirming the subject to be open to public.

In accordance with one aspect of the present disclosure, there is provided a method for information management using at least one specific tree based on a blockchain, including steps of: (a) a user device, if one or more private data related to at least one subject are acquired from a specific user of the user device, generating or supporting another device to generate the specific tree, wherein the specific tree has leaf nodes to which each of private function values, created by applying its corresponding algorithm to each of the private data or their processed values, is allocated; and (b) the user device (i) performs one of processes of (i-1) registering a representative value of the specific tree as a subject ID of the subject in the blockchain such that the representative value corresponds to the subject and (i-2) registering information on the specific tree as the subject ID of the subject in the blockchain such that the information on the specific tree corresponds to the subject, and (ii) supports another device to perform one of processes of (ii-1) registering the representative value of the specific tree as the subject ID of the subject in the blockchain such that the representative value corresponds to the subject and (ii-2) registering the information on the specific tree as the subject ID of the subject in the blockchain such that the information on the specific tree corresponds to the subject.

As one example, the user device performs or supports another device to perform processes of generating one or more pseudo-public data including (i) one or more prefix values, corresponding to specific private data among the private data, which are one of (i-1) one or more representative private values of one or more specific ranges of the specific private data and (i-2) one or more reliability values of the specific private data, and (ii) a specific private value of the specific private data, registering the generated pseudo-public data as one or more sub-data corresponding to a sub-structure of a specific leaf node to which the specific private data is allocated, and allocating a pseudo-public function value created by applying the algorithm to the pseudo-public data to the specific leaf node.

As one example, the user device performs or supports another device to perform processes of generating prefix values, corresponding to the specific private data, determining the pseudo-public data of multi-levels including (i) the prefix values and (ii) the specific private function value of the specific private data, registering the pseudo-public data of multi-levels as the sub-data corresponding to the specific leaf node, and allocating a partial pseudo-public function value created by applying the algorithm to at least part of the pseudo-public data of multi-levels to the specific leaf node.

As one example, the pseudo-public data of lower levels covers at least one broader open range of the specific private data, and wherein the pseudo-public data of a specific level include (i) a specific prefix value corresponding to the specific level and (ii) a lower function value of the pseudo-public data of a level just below the specific level or the specific private function value of the specific private data.

As one example, the user device allocates or supports another device to allocate a top function value, created by applying the algorithm to the pseudo-public data of a highest level among the pseudo-public data of multi-levels, to the specific leaf node.

As one example, said their processed values are the pseudo-public data including (i) one or more prefix values, corresponding to specific private data among the private data, which is one of (i-1) one or more representative private values of one or more specific ranges of the specific private data and (i-2) one or more reliability values of the specific private data, and (ii) the specific private function value of the specific private data.

As one example, (x1) the user device performs or supports another device to perform calculating at least one intermediate function value by applying the algorithm to the private function values allocated to sibling nodes neighboring with each other among nodes, of the specific tree, to which the private function values are allocated, and allocating the intermediate function value to a parent node of the sibling nodes, (x2) the user device determines or supports another device to determine, if the parent node is a representative node of the specific tree, the intermediate function value allocated to the parent node as a representative value of the specific tree, and (x3) the user device performs or supports another device to perform (x1) to (x2) repeatedly, if the parent node is not the representative node of the specific tree, by treating the parent node as one of the sibling nodes.

As one example, the user device, if at least part of the leaf nodes do not have any private function values allocated thereto, allocates or supports another device to allocate one or more certain function values to said at least part of the leaf nodes.

In accordance with another aspect of the present disclosure, there is provided a method for information management using at least one specific tree based on a blockchain, including steps of: (a) a service-providing server, on condition that at least one specific tree for reference has been generated and information on the specific tree for reference has been registered as a subject ID of at least one subject in the blockchain such that the information on the specific tree for reference corresponds to the subject, wherein the specific tree for reference has leaf nodes to which each of private function values, created by applying its corresponding algorithm to each of one or more private data related to the subject or their processed values, is allocated, if specific private data among the private data is acquired from at least one user device, acquiring or supporting another device to acquire the information on the specific tree for reference stored in the blockchain as corresponding to the subject; and (b) the service-providing server allocating or supporting another device to allocate at least one specific private function value, created by applying the algorithm to the specific private data or their processed values, to at least one specific leaf node at a location corresponding to the specific private data by referring to the information on the specific tree for reference, to thereby generate at least one specific tree for comparison, and determining or supporting another device to determine whether the specific private data acquired from the user device is forged by comparing a representative value of the specific tree for comparison and a representative value in the information on the specific tree for reference acquired from the blockchain.

In accordance with still another aspect of the present disclosure, there is provided a user device for information management using at least one specific tree based on a blockchain, including: at least one memory that stores instructions; and at least one processor configured to execute the instructions to perform processes of: (I), if one or more private data related to at least one subject are acquired from a specific user of the user device, generating or supporting another device to generate the specific tree, wherein the specific tree has leaf nodes to which each of private function values, created by applying its corresponding algorithm to each of the private data or their processed values, is allocated, and (II) (i) (i-1) registering a representative value of the specific tree as a subject ID of the subject in the blockchain such that the representative value corresponds to the subject and (i-2) registering information on the specific tree as the subject ID of the subject in the blockchain such that the information on the specific tree corresponds to the subject, and (ii) supporting another device to perform one (ii-1) registering the representative value of the specific tree as the subject ID of the subject in the blockchain such that the representative value corresponds to the subject and (ii-2) registering the information on the specific tree as the subject ID of the subject in the blockchain such that the information on the specific tree corresponds to the subject.

As one example, the processor performs or supports another device to perform processes of generating one or more pseudo-public data including (i) one or more prefix values, corresponding to specific private data among the private data, which are one of (i-1) one or more representative private values of one or more specific ranges of the specific private data and (i-2) one or more reliability values of the specific private data, and (ii) a specific private value of the specific private data, registering the generated pseudo-public data as one or more sub-data corresponding to a sub-structure of a specific leaf node to which the specific private data is allocated, and allocating a pseudo-public function value created by applying the algorithm to the pseudo-public data to the specific leaf node.

As one example, the processor performs or supports another device to perform processes of generating prefix values, corresponding to the specific private data, determining the pseudo-public data of multi-levels including (i) the prefix values and (ii) the specific private function value of the specific private data, registering the pseudo-public data of multi-levels as the sub-data corresponding to the specific leaf node, and allocating a partial pseudo-public function value created by applying the algorithm to at least part of the pseudo-public data of multi-levels to the specific leaf node.

As one example, the pseudo-public data of lower levels covers at least one broader open range of the specific private data, and wherein the pseudo-public data of a specific level include (i) a specific prefix value corresponding to the specific level and (ii) a lower function value of the pseudo-public data of a level just below the specific level or the specific private function value of the specific private data.

As one example, the processor allocates or supports another device to allocate a top function value, created by applying the algorithm to the pseudo-public data of a highest level among the pseudo-public data of multi-levels, to the specific leaf node.

As one example, said their processed values are the pseudo-public data including (i) one or more prefix values, corresponding to specific private data among the private data, which is one of (i-1) one or more representative private values of one or more specific ranges of the specific private data and (i-2) one or more reliability values of the specific private data, and (ii) the specific private function value of the specific private data.

As one example, (x1) the processor performs or supports another device to perform calculating at least one intermediate function value by applying the algorithm to the private function values allocated to sibling nodes neighboring with each other among nodes, of the specific tree, to which the private function values are allocated, and allocating the intermediate function value to a parent node of the sibling nodes, (x2) the processor determines or supports another device to determine, if the parent node is a representative node of the specific tree, the intermediate function value allocated to the parent node as a representative value of the specific tree, and (x3) the processor performs or supports another device to perform (x1) to (x2) repeatedly, if the parent node is not the representative node of the specific tree, by treating the parent node as one of the sibling nodes.

As one example, the processor, if at least part of the leaf nodes do not have any private function values allocated thereto, allocates or supports another device to allocate one or more certain function values to said at least part of the leaf nodes.

In accordance with still yet another aspect of the present disclosure, there is provided a service-providing server for information management using at least one specific tree based on a blockchain, including: at least one memory that stores instructions; and at least one processor configured to execute the instructions to perform processes of: (I) on condition that at least one specific tree for reference has been generated and information on the specific tree for reference has been registered as a subject ID of at least one subject in the blockchain such that the information on the specific tree for reference corresponds to the subject, wherein the specific tree for reference has leaf nodes to which each of private function values, created by applying its corresponding algorithm to each of one or more private data related to the subject or their processed values, is allocated, if specific private data among the private data is acquired from at least one user device, acquiring or supporting another device to acquire the information on the specific tree for reference stored in the blockchain as corresponding to the subject; and (II) allocating or supporting another device to allocate at least one specific private function value, created by applying the algorithm to the specific private data or their processed values, to at least one specific leaf node at a location corresponding to the specific private data by referring to the information on the specific tree for reference, to thereby generate at least one specific tree for comparison, and determining or supporting another device to determine whether the specific private data acquired from the user device is forged by comparing a representative value of the specific tree for comparison and a representative value in the information on the specific tree for reference acquired from the blockchain.

Further, in accordance with one example embodiment of the present disclosure, the information-managing server, the user device, and the service-providing system for performing methods mentioned above are provided.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 1:
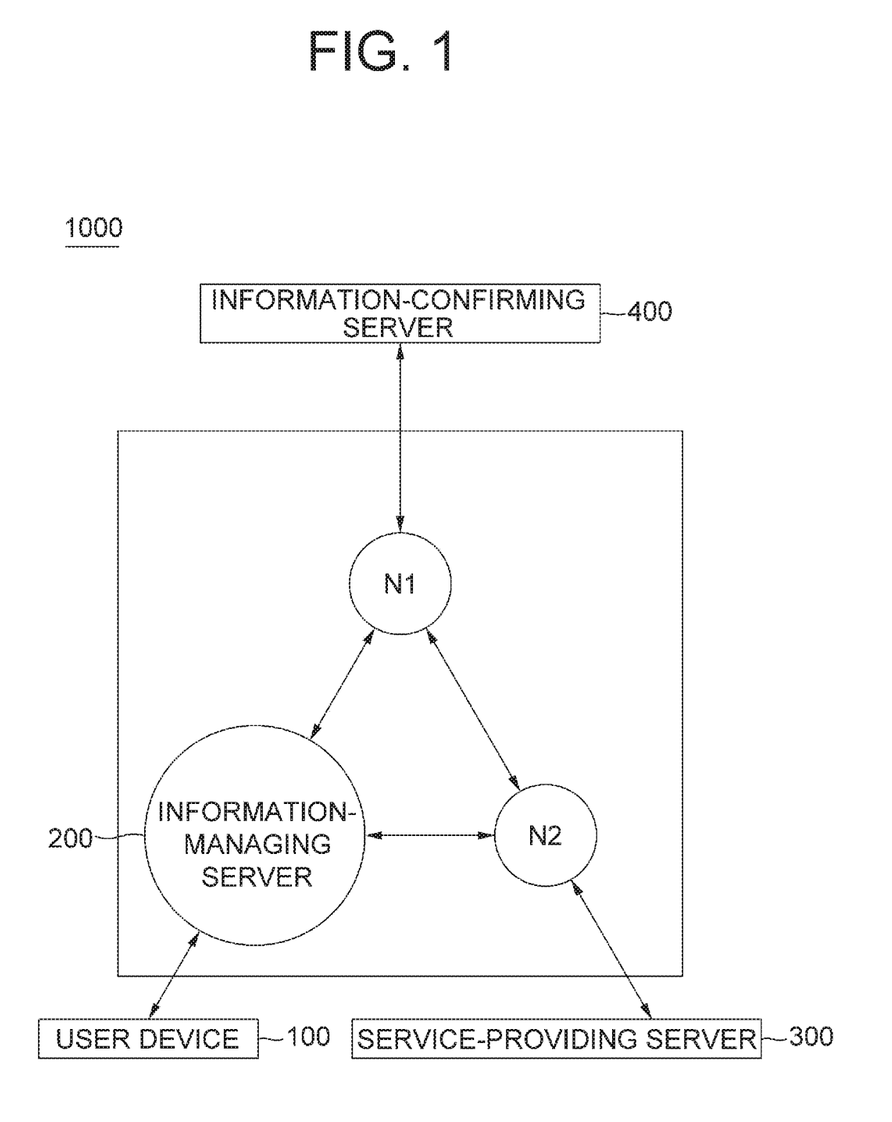
FIG. 1 is a drawing schematically illustrating an information management system using a specific tree based on a blockchain in accordance with one example embodiment of the present disclosure.

FIG. 1 is a drawing schematically illustrating an information management system using at least one specific tree based on a blockchain in accordance with one example embodiment of the present disclosure. By referring to FIG. 1, the information management system 1000 may include a user device 100, an information-managing server 200, and a service-providing server 300. Herein, the specific tree may be at least one Merkle tree, but the scope of the present disclosure is not limited thereto.

First, the user device 100 may be a generator of one or more private data of at least one subject, and may include a PC (Personal Computer), a mobile computer, a PDA/EDA, a mobile phone, a smart phone, a tablet, an IoT device, etc. And, the user device 100 is not limited thereto, and may include any mobile device like a digital camera, a personal navigation device, and a mobile gaming device, etc. capable of wired and wireless communication. In addition, the user device 100 may include a communication part and a processor.

Also, the user device 100 may perform or support another device to perform processes of (i) generating the specific tree which has leaf nodes to which each of private function values, created by applying its corresponding algorithm, i.e., a function, to each of the private data or their processed values, is allocated, and where the private data are related to the subject, and (ii) registering a representative value of the specific tree or information on the specific tree as a subject ID of the subject in the blockchain such that the representative value corresponds to the subject or that the information on the specific tree corresponds to the subject. Herein, said its corresponding algorithm, i.e., the function, may be a hash function, but the scope of the present disclosure is not limited thereto. Herein, the private function values may be created by applying the hash function to each of the private data or their processed values, but the scope of the present disclosure is not limited thereto. Herein, the representative value may be a root value of the specific tree, e.g., the Merkle tree, but the scope of the present disclosure is not limited thereto.

Next, the information-managing server 200 may manage the private data related to the subject or information related to the private data, and may perform operations related to management of the private data of the subject. Further, the information-managing server 200 may be at least one server corresponding to or managing each of nodes N1 and N2 of the blockchain. Herein, FIG. 1 shows two nodes N1 and N2 of the blockchain, but the number of the nodes is not limited thereto. In addition, the information-managing server 200 may be a transaction server which manages transactions with other devices regarding the management of the private data related to the subject.

The information-managing server 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other linked devices. As one example, such requests and responses may be carried out by the same TCP session, but the scope of the present invention is not limited thereto. For example, they could be transmitted and received as UDP datagrams.

Also, the processor of such devices may include hardware configuration of MPU (Micro Processing Unit) or CPU (Central Processing Unit), cache memory, data bus, etc. Additionally, any OS and software configuration of applications that achieve specific purposes may be further included.

Next, the service-providing server 300 may provide on-line or off-line services to users of other computing devices, and may confirm authenticities of the minimal private data of the subject using the blockchain, to thereby determine whether to provide the services. In addition, the service-providing server 300 may include a communication part, a processor, and a memory.

In addition, the information management system 1000 may further include an information-confirming server 400, and the information-confirming server 400 may confirm the authenticities or reliabilities of the private data of the subject and may include a communication part, a processor, and a memory.

A method of the information management using the specific tree based on the blockchain via the information management system configured as such in accordance with one example embodiment of the present disclosure is described as follows.

First, a specific user may transmit the private data related to the subject, e.g., an individual user or a specific device, to be managed, by way of the user device 100. That is, the specific user may input the private data to be managed using the user device 100, or the IoT device itself, requiring registration, may transmit its stored private data. Herein, the private data may be personal information of the specific user or individual information of the specific device, e.g., an IoT device, and may include the personal information such as a name, an e-mail address, a phone number, a birth date, an SSN, an address, an account number, etc. of the specific user and may include product information such as a unique name, a serial number, an IP address, a MAC address, a manufacturing number, etc. of the specific device.

Then, (i) the communication part of the information-managing server 200 may acquire or support another device to acquire the private data related to the subject transmitted from the user device 100, and (ii) the processor of the information-managing server 200 may perform or support another device to perform processes of (ii-1) creating each of the private function values by applying the function to each of the private data, acquired via the communication part, or their processed values, and (ii-2) allocating each of the private function values to the leaf nodes of the specific tree, to thereby generate the specific tree.

Figure 2:
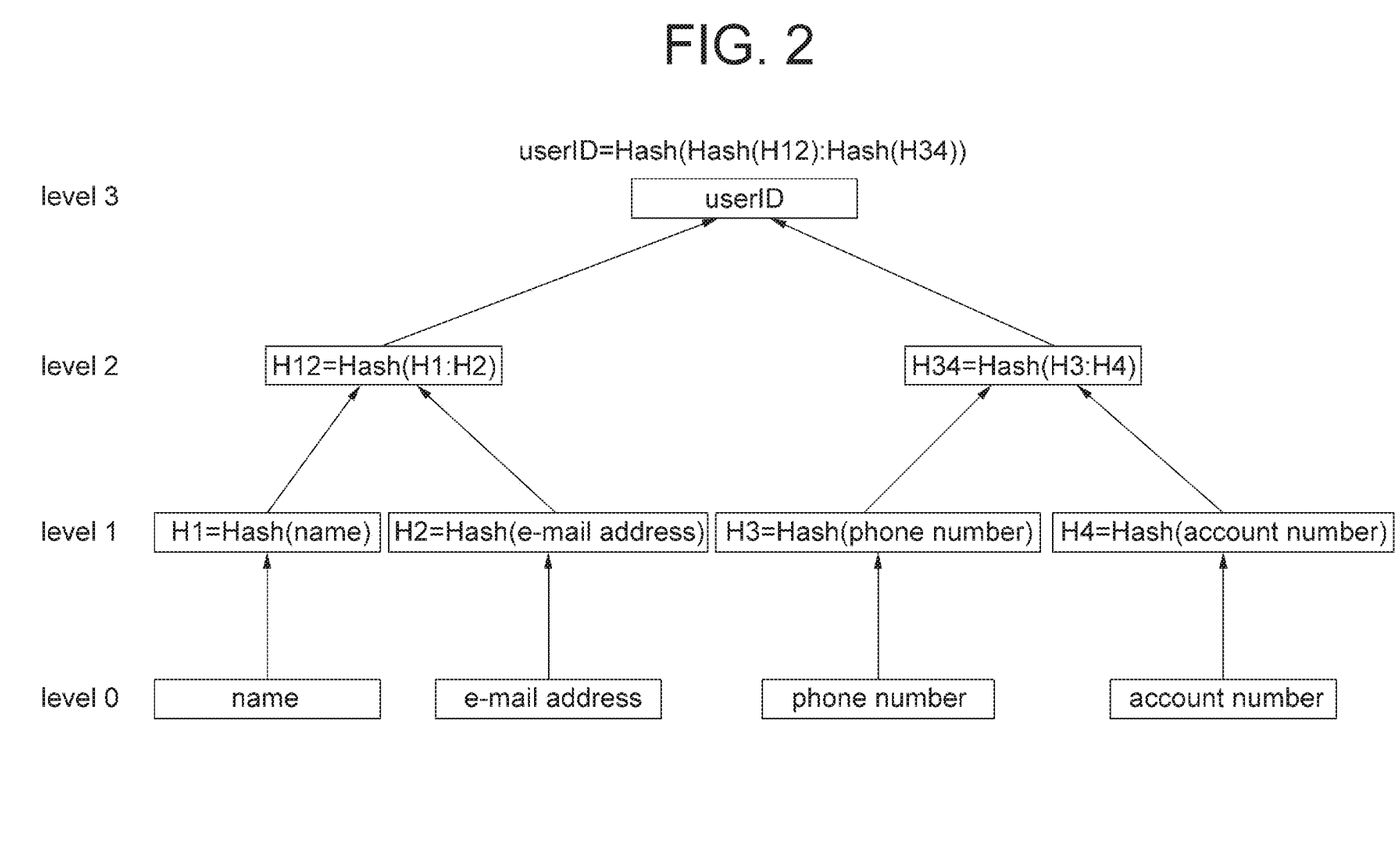
FIG. 2 is a drawing schematically illustrating a process of managing private data of a subject using the specific tree based on the blockchain in accordance with one example embodiment of the present disclosure.

That is, by referring to FIG. 2, the information-managing server 200 may apply the function to each of the private data of level 0, to thereby generate each of the private function values H1, H2, H3, and H4. Herein, said H1, H2, H3, and H4 may be expressed as H1=Hash(name), H2=Hash(e-mail address), H3=Hash(phone number), and H4=Hash(account number). Herein, FIG. 2 shows four pieces of the private data, but the number of the pieces of the private data is not limited thereto.

Thereafter, each of the private function values H1, H2, H3, and H4 corresponding to each piece of the generated private data may be allocated to the leaf nodes of level 1, and the specific tree may be generated by a specific tree operation.

Herein, the information-managing server 200 may perform or support another device to perform processes of (i) calculating at least one intermediate function value by applying the function to the private function values allocated to sibling nodes neighboring with each other among nodes, of the specific tree, to which the private function values are allocated, (ii) allocating the intermediate function value to a parent node of the sibling nodes, (iii) determining the intermediate function value allocated to the parent node as a representative value of the specific tree if the parent node is a representative node of the specific tree, and (iv) performing processes of (i) to (iii) repeatedly, if the parent node is not the representative node of the specific tree, by treating the parent node as one of the sibling nodes, to thereby generate the specific tree as shown in FIG. 2.

That is, as in FIG. 2, the information-managing server 200 may generate a function value H12(H12=Hash(H1:H2)) by applying the function to H1 and H2 which are function values of the neighboring sibling nodes among the leaf nodes of level 1, generate a function value H34(H34=Hash(H3:H4)) by applying the function to H3 and H4, to thereby allocate each of the generated function values H12 and H34 to branch nodes of level 2 which are the parent nodes.

Herein, because none of the parent nodes of level 2 is the representative node of the specific tree, the information-managing server 200 may generate a function value H1234 by applying the function to H12 and H34 which are function values of the neighboring sibling nodes among the branch nodes of level 2, to thereby allocate the function value H1234 to a branch node of level 3 which is the parent node. Herein, the function value H1234 may be expressed as Hash(H12:H34), Hash(Hash(H1:H2)):Hash(H3:H4)) or Hash(Hash(Hash(name):Hash(e-mail address)):Hash(Hash(phone number):Hash(account number))).

And, because the parent node of level 3 is the representative node of the specific tree, the information-managing server 200 may generate the specific tree as in FIG. 2, and as another example, the specific tree may have the branch nodes of more levels according to the number of its leaf nodes.

Also, when generating the specific tree, if at least part of the leaf nodes do not have any private function values allocated thereto, the information-managing server 200 may allocate or support another device to allocate one or more certain function values to said at least part of the leaf nodes. That is, because $2^n$ of leaf nodes are required for generating the specific tree, if the number of the pieces of the private data of the subject to be managed does not correspond to $2^n$, the number of additional leaf nodes required for generating the specific tree may be added by allocating the certain function values.

Said their processed values of the private data above may be pseudo-public data including (i) one or more prefix values, corresponding to specific private data among the private data, and (ii) at least one specific private value of the specific private data. Herein, the pseudo-public data is data whose at least part thereof is open to public and at least the rest part thereof is hidden from the public.

Herein, the prefix values may be one or more representative private values of one or more specific ranges of the specific private data. As one example, if the specific private data is an address of "600 Dulany Street, Alexandria, Va.", then "Virginia", "Alexandria, Va.", or "Dulany Street, Alexandria, Va." may be generated as the prefix values, or "Virginia", "Alexandria", or "Dulany Street" may be generated as the prefix values. That is, the prefix values may be part of the private data good to go public, or a minimal range of the private data for rough confirmation of the subject. This may be for a purpose of encrypting and hiding the private data of the subject, or encrypting the private data of the subject but opening part of the private data to the public, because all of information registered in an open ledger, which is a feature of the blockchain, is open to the public by definition.

The prefix values of the specific private data are shown above as allocated to part of the leaf nodes of the specific tree, but the prefix values may be registered as one or more sub-data of the leaf nodes.

Figure 3:
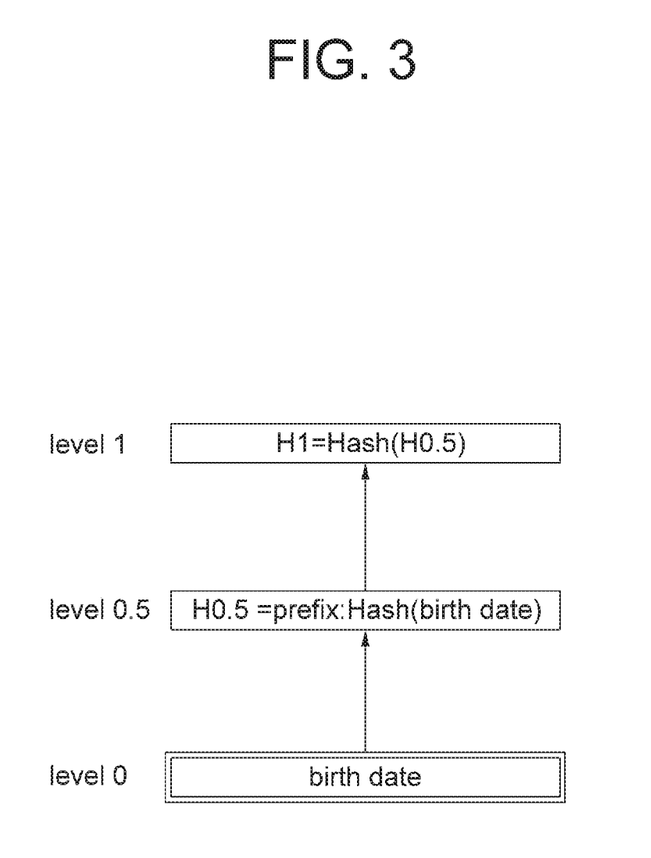
FIG. 3 is a drawing schematically illustrating another process of managing the private data of the subject using the specific tree based on the blockchain in accordance with one example embodiment of the present disclosure.

That is, by referring to FIG. 3, the information-managing server 200 may perform or support another device to perform processes of (i) generating the pseudo-public data H0.5 including (i-1) the prefix values, corresponding to the specific private data among the private data, and (i-2) the specific private function value of the specific private data, (ii) registering the generated pseudo-public data as the sub-data corresponding to a specific leaf node corresponding to the specific private data, and (iii) allocating a pseudo-public function value H1=Hash(H0.5), created by applying the function to the pseudo-public data, to the specific leaf node. As a result, although the sub-data registered in the specific leaf node and the information on the specific tree may be open to all of the users of the blockchain, because information open to the public is the prefix values and the specific private function value of the specific private data, practically, only the prefix values of the specific private data in the blockchain may be open to the public, but the specific private data may remain undisclosed.

Figure 4:
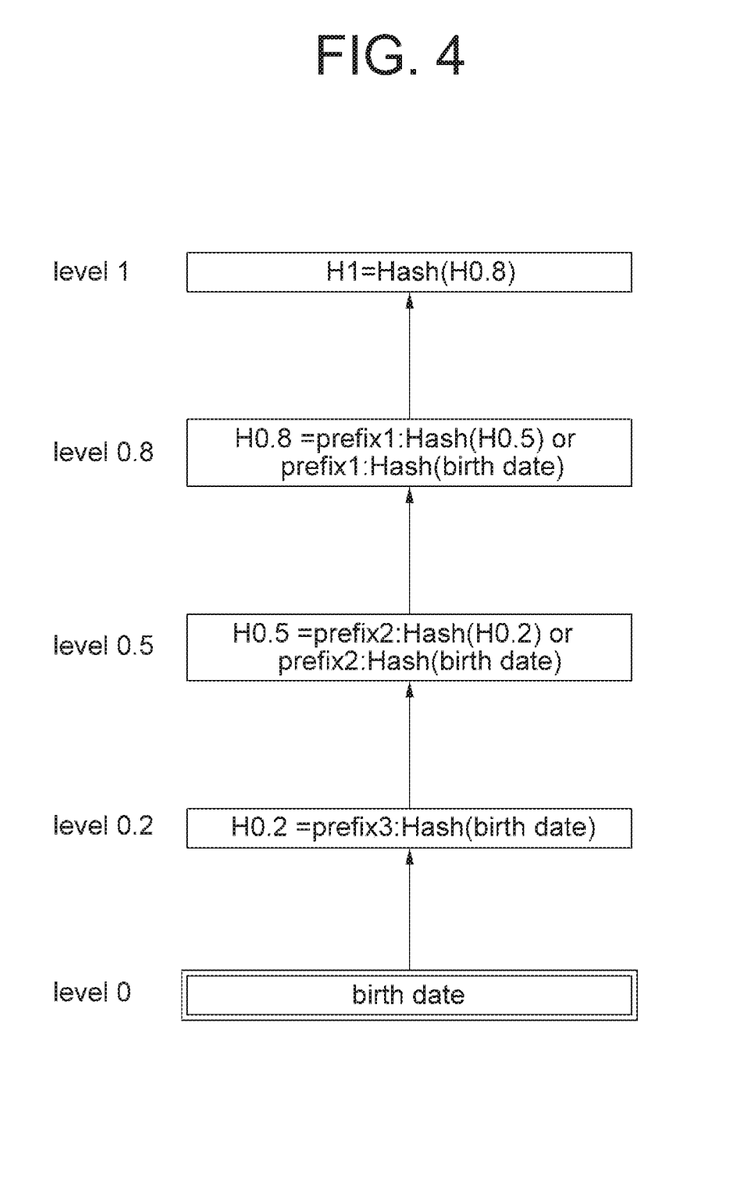
FIG. 4 is a drawing schematically illustrating still another process of managing the private data of the subject using the specific tree based on the blockchain in accordance with one example embodiment of the present disclosure.

Also, by referring to FIG. 4, the information-managing server 200 may (i) generate the multiple prefixes prefix1, prefix2, and prefix3 corresponding to the specific private data, (ii) generate the pseudo-public data H08, H0.5, and H0.2 of multi-levels including each of the multiple prefixes and the specific private function value Hash(birth date) corresponding to the specific private data, (iii) register the pseudo-public data of multi-levels as the sub-data level 0.8, level 0.5, and level 0.2 corresponding to the specific leaf node, and (iv) allocate at least one partial pseudo-public function value, created by applying the function to at least part of the pseudo-public data of multi-levels, to the specific leaf node.

As one example, supposing that the specific private data is an SSN of "180101-*****" with a date literal of "yymmdd-*****", the sub-data may be generated as follows.

level 1 H1=Hash(H0.8)
level 0.8 H0.8=18:Hash(H0.5) or H0.8=18:Hash(180101-*******)
level 0.5 H0.5=1801:Hash(H0.2) or H0.5=180101:Hash(180101-*******)
level 0.2 H0.2=180101:Hash(180101-*******)
level 0 180101-*******

That is, by using the prefix values, a year (18) at a level 0.8, a year and a month (1801) at a level 0.5, and a year, a month, and a day (180101) may be open to the public.

Herein, the information-managing server 200 may allow the pseudo-public data of lower levels to cover at least one broader open range of the specific private data, and the pseudo-public data of a specific level may include (i) (i-1) a specific prefix value corresponding to the specific level and (i-2) a lower function value of the pseudo-public data of a level just below the specific level or (ii) (ii-1) the specific prefix value corresponding to the specific level and (ii-2) the specific private function value of the specific private data.

And, the information-managing server 200 may allocate or support another device to allocate a top function value created by applying the function to the pseudo-public data of a highest level among the pseudo-public data of multi-levels to the specific leaf node.

Thereafter, the information-managing server 200 may register the representative value userID=Hash1234=Hash(Hash(H1:H2):Hash(H3:H4) of the generated specific tree as the subject ID of the subject in the blockchain such that the representative value corresponds to the subject, or may register the information on the specific tree as the subject ID of the subject in the blockchain such that the information on the specific tree corresponds to the subject. Also, the information-managing server 200 may support another device to register the representative value of the specific tree or the information on the specific tree as the subject ID of the subject in the blockchain such that the representative value or the information on the specific tree corresponds to the subject, as the case may be.

Especially, if the information-managing server 200 is functioning as at least one of the nodes in the blockchain, at least one smart contract capable of performing the processes above may be registered in the blockchain, and in response to a triggering signal, the information-managing server 200, functioning as said at least one of the nodes in the blockchain, may generate the specific tree of the private data of the subject by executing the smart contract, and may register the subject ID of the subject in the blockchain.

In the above example, although the information-managing server 200 is shown as generating the subject ID by using the specific tree of the private data, to be managed, of the subject, and as registering and managing the subject ID in the blockchain, the user device 100 itself may generate the subject ID using the specific tree, and register and manage the subject ID.

That is, if one or more inputs by the specific user or the private data, related to the subject, registered in the specific device are acquired, the user device 100 may perform or support another device to perform processes of (i) generating the specific tree which has the leaf nodes to which each of the private function values, created by applying the function to each of the private data or their processed values, is allocated, and (ii) registering the representative value of the specific tree or the information on the specific tree as the subject ID of the subject in the blockchain such that the representative value corresponds to the subject or that the information on the specific tree corresponds to the subject, as the case may be.

Also, if the specific tree is being generated by the user device 100, said their processed values of the private data may be generated by using the prefix values of the specific private data according to the processes above.

Although the prefix values are generated by using the specific private data as above, reliability values of the specific private data confirmed by the information-confirming server 400 may be set as the prefix values.

As one example, the user device 100 or the information-managing server 200 may transmit the specific private data of the subject to the information-confirming server 400, to thereby evaluate the reliability values, receive the evaluated reliability values of the specific private data, to thereby generate the prefix values of the specific private data, and register the prefix values as the sub-data of the specific leaf node, as in the processes above.

Also, in the above description, the user device 100 may generate a private key and a public key, and register the public key to identify the subject, and confirm a validity of a transaction generated from the subject by using a signature value utilizing the private key.

Figure 5:
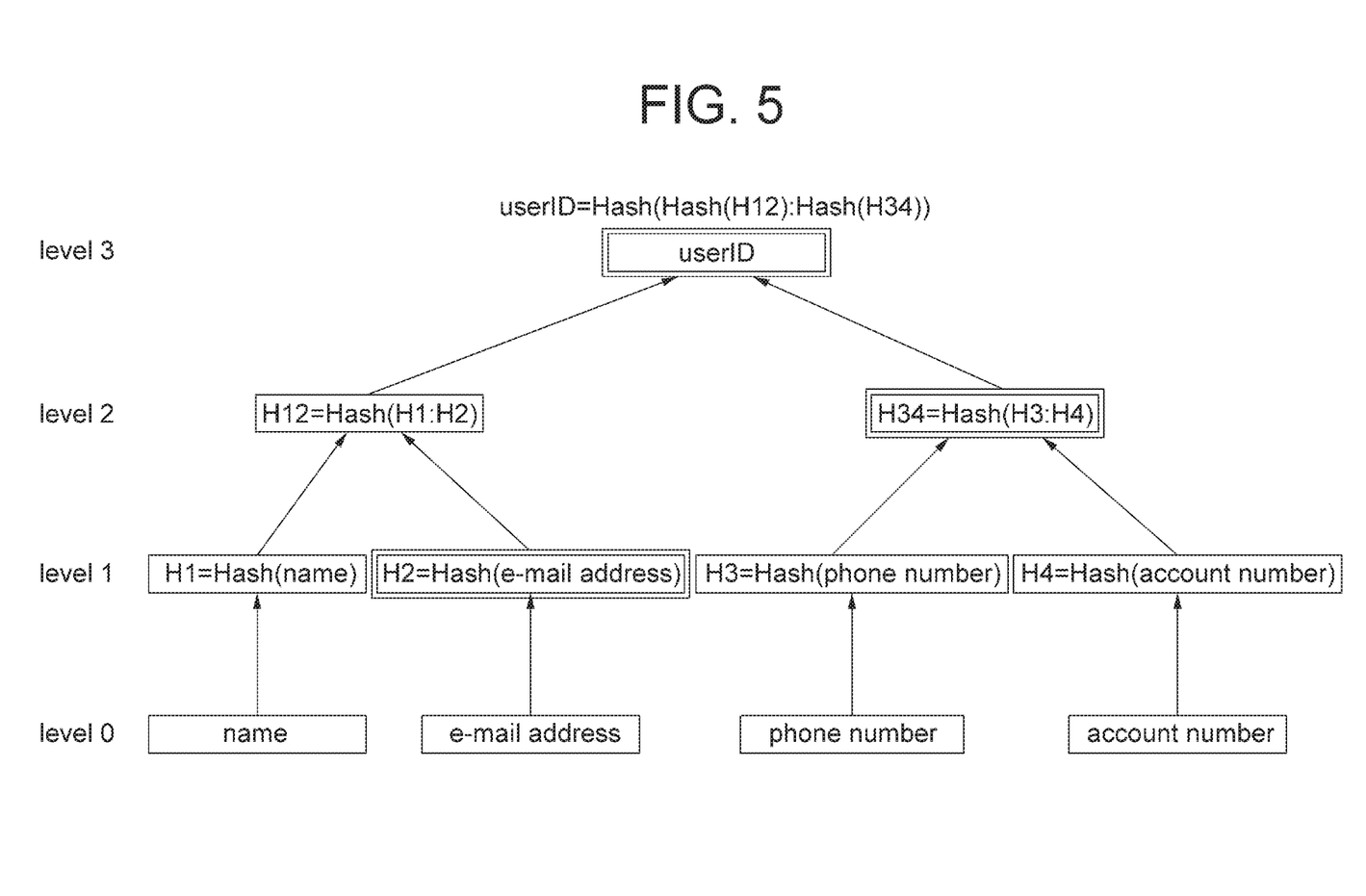
FIG. 5 is a drawing schematically illustrating a process of confirming the private data of the subject using the specific tree based on the blockchain in accordance with one example embodiment of the present disclosure.

A method of confirmation, on condition that the subject ID related to the private data of the subject has been registered in the blockchain, is described by referring to FIG. 5 as follows. For reference, in the description below, the phrase "for reference" is added for terms related to subjects or concepts that are registered or stored in advance to be used as a reference, and the phrase "for comparison" is added for terms related to subjects or concepts that are presented or requested to be compared with, to avoid possible confusion.

First, by the processes above, the specific tree may be generated which has the leaf nodes to which each of the private function values, created by applying the function to each of the private data or their processed values, is allocated, and the representative value of the specific tree may be registered as the subject ID of the subject in the blockchain such that the representative value corresponds to the subject.

In this state, for use of the services provided by the service-providing server 300, at least part of (i) the specific private data or their processed values, among the private data related to the subject, and (ii) information on the branch nodes, among the nodes of the specific tree, not including the specific private data or their processed values, may be transmitted from the user device 100. That is, as information to be used for confirming permission to use the services provided by the service-providing server 300, at least part of (i) the specific private data or their processed values, not the whole private data of the subject, and (ii) information on the branch nodes, among the nodes of the specific tree, not including the specific private data or their processed values, to be used for confirming the specific private data or their processed values, may be transmitted, for example, H2, H34, and H1234(userID) in FIG. 5 may be transmitted. This is minimal information allowing the service-providing server 300 to confirm whether the subject has the permission by using the specific private data or their processed values, and as another example, the whole information on the specific tree may be transmitted.

Then, the service-providing server 300 may apply the function to the specific private data or their processed values provided from the user device 100, to thereby generate the specific private function value, and generate a representative value of a specific tree for comparison by referring to the generated specific private function value and the information on the branch nodes provided from the user device 100.

And, the service-providing server 300 may acquire or support another device to acquire the representative value of the specific tree for reference which is the subject ID registered in the blockchain as corresponding to the subject. Herein, the service-providing server 300 may use the public key transmitted from the user device 100, to retrieve the representative value of the specific tree for reference, which is the subject ID, from the blockchain.

Thereafter, the service-providing server 300 may compare the representative value of the specific tree for reference retrieved from the blockchain and the generated representative value of the specific tree for comparison, to thereby determine the authenticity of the specific private data and their processed values provided from the user device 100, and if the representative value of the specific tree for reference retrieved from the blockchain is determined as identical to the generated representative value of the specific tree for comparison, may confirm that the specific user has a permission to access the services, and may allow the user device 100 to use the services.

Herein, information provided by the user device 100 may be the specific private data which is part, not the whole, of the private data of the subject, and the service-providing server 300 may confirm, by using the specific private data, the permission via user identification information, i.e., the subject ID, registered in the blockchain, and thus unnecessary exposure of the private data may be minimized.

As another example, the specific tree for reference may be generated which has the leaf nodes to which each of the private function values, created by applying the function to each of the private data or their processed values, is allocated, and the information on the specific tree for reference may be registered as the subject ID of the subject in the blockchain such that the information on the specific tree for reference corresponds to the subject.

In this case, for use of the services provided by the service-providing server 300, the user device 100 may transmit the specific private data among the private data related to the subject.

Then, the service-providing server 300 may acquire or support another device to acquire the information on the specific tree for reference registered in the blockchain as corresponding to the subject. Herein, the service-providing server 300 may use the public key transmitted from the user device 100, to retrieve the information on the specific tree for reference corresponding to the subject registered in the blockchain.

And, the service-providing server 300 may allocate or support another device to allocate the specific private function value, acquired from the user device 100 or created by applying the function to the processed values of the specific private data, to the specific leaf node at a location corresponding to the specific private data by referring to the information on the specific tree for reference retrieved from the blockchain, to thereby generate at least one specific tree for comparison. Herein, because the processed values of the specific private data is the pseudo-public data open to the public along with the specific tree as aforementioned, the processed values may be generated by using the specific private function value of the specific private data and the prefix values open to the public.

Thereafter, the service-providing server 300 may compare the representative value of the specific tree for reference and the representative value of the specific tree for comparison, to thereby determine the authenticity of the specific private data provided from the user device 100, and if the representative value of the specific tree for reference is determined as identical to the representative value of the specific tree for comparison, may confirm that the specific user has the permission to access the services, and may allow the user device 100 to use the services.

The present disclosure has an effect of reducing risk of exposure of the private data by managing the private data of the subject using highly secure blockchain technology.

The present disclosure has another effect of enhancing security of the private data of the subject, by confirming the subject using only individual private data among the private data, thus minimizing the unnecessary exposure of the private data.

The present disclosure has still another effect of confirming general information on the subject easily by allowing part of the private data to be used for confirming the subject to be open to the public.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for information management using a specific tree based on a blockchain, comprising steps of:
   (a) a user device, in response to one or more private data related to a subject being acquired from a specific user of the user device, generating the specific tree, wherein the specific tree has leaf nodes to which each of private function values, created by applying its corresponding algorithm to each of the private data or their processed values, is allocated, wherein each private data of the one or more private data is the one or more private data to be registered in an open ledger of the blockchain without being opened to the public, and each of the one or more private data belongs to a set of private data that identifies the subject; and
   (b) the user device (i) performs one of processes of (i-1) registering a representative value of the specific tree as a subject ID of the subject in the blockchain such that the representative value corresponds to the subject and (i-2) registering information on the specific tree as the subject ID of the subject in the blockchain such that the information on the specific tree corresponds to the subject, and (ii) supports another device to perform one of processes of (ii-1) registering the representative value of the specific tree as the subject ID of the subject in the blockchain such that the representative value corresponds to the subject and (ii-2) registering the information on the specific tree as the subject ID of the subject in the blockchain such that the information on the specific tree corresponds to the subject,
   wherein, at the step of (a), the user device performs or supports another device to perform processes of generating one or more pseudo-public data including (i) one or more prefix values, corresponding to specific private data among the private data, which are one of (i-1) one or more representative private values of one or more specific ranges of the specific private data and (i-2) one or more reliability values of the specific private data, and (ii) a specific private value of the specific private data, registering the generated pseudo-public data as one or more sub-data corresponding to a sub-structure of a specific leaf node to which the specific private data is allocated, and allocating a pseudo-public function value created by applying the algorithm to the pseudo-public data to the specific leaf node.

2. The method of claim 1, wherein the user device performs or supports another device to perform processes of generating prefix values, corresponding to the specific private data, determining the pseudo-public data of multi-levels including (i) the prefix values and (ii) the specific private function value of the specific private data, registering the pseudo-public data of multi-levels as the sub-data corresponding to the specific leaf node, and allocating a partial pseudo-public function value created by applying the algorithm to at least part of the pseudo-public data of multi-levels to the specific leaf node.

3. The method of claim 2, wherein the pseudo-public data of lower levels covers at least one broader open range of the specific private data, and wherein the pseudo-public data of a specific level include (i) a specific prefix value corresponding to the specific level and (ii) a lower function value of the pseudo-public data of a level just below the specific level or the specific private function value of the specific private data.

4. The method of claim 3, wherein the user device allocates or supports another device to allocate a top function value, created by applying the algorithm to the pseudo-public data of a highest level among the pseudo-public data of multi-levels, to the specific leaf node.

5. The method of claim 1, wherein, at the step of (a), said their processed values are the pseudo-public data including (i) one or more prefix values, corresponding to specific private data among the private data, which is one of (i-1) one or more representative private values of one or more specific ranges of the specific private data and (i-2) one or more reliability values of the specific private data, and (ii) the specific private function value of the specific private data.

6. The method of claim 1, wherein, at the step of (a),
(x1) the user device performs or supports another device to perform calculating at least one intermediate function value by applying the algorithm to the private function values allocated to sibling nodes neighboring with each other among nodes, of the specific tree, to which the private function values are allocated, and allocating the intermediate function value to a parent node of the sibling nodes,
(x2) the user device determines or supports another device to determine, if the parent node is a representative node of the specific tree, the intermediate function value allocated to the parent node as a representative value of the specific tree, and
(x3) the user device performs or supports another device to perform (x1) to (x2) repeatedly, if the parent node is not the representative node of the specific tree, by treating the parent node as one of the sibling nodes.

7. The method of claim 1, wherein, at the step of (a), the user device, if at least part of the leaf nodes do not have any private function values allocated thereto, allocates or supports another device to allocate one or more certain function values to said at least part of the leaf nodes.

8. A method for information management using a specific tree based on a blockchain, comprising steps of:
(a) a service-providing server, on condition that a specific tree for reference has been generated and information on the specific tree for reference has been registered as a subject ID of a subject in the blockchain such that the information on the specific tree for reference corresponds to the subject, wherein the specific tree for reference has leaf nodes to which each of private function values, created by applying its corresponding algorithm to each of one or more private data related to the subject or their processed values, is allocated, if in response to specific private data among the private data is being-acquired from a user device, acquiring the information on the specific tree for reference stored in the blockchain as corresponding to the subject, wherein each private data of the one or more private data is to be registered in an open ledger of the blockchain without being opened to the public, and each of the one or more private data belongs to a set of private data that identifies the subject; and
(b) the service-providing server allocating a specific private function value, created by applying the algorithm to the specific private data or their processed values, to a specific leaf node at a location corresponding to the specific private data by referring to the information on the specific tree for reference, to thereby generate a specific tree for comparison, and determining whether the specific private data acquired from the user device is forged by comparing a representative value of the specific tree for comparison and a representative value in the information on the specific tree for reference acquired from the blockchain, wherein the method further comprising
generating one or more pseudo-public data including (i) one or more prefix values, corresponding to specific private data among the private data, which are one of (i-1) one or more representative private values of one or more specific ranges of the specific private data and (i-2) one or more reliability values of the specific private data, and (ii) a specific private value of the specific private data;
registering the generated pseudo-public data as one or more sub-data corresponding to a sub-structure of a specific leaf node to which the specific private data is allocated, and
allocating a pseudo-public function value created by applying the algorithm to the pseudo-public data to the specific leaf node.

9. A user device for information management using a specific tree based on a blockchain, comprising:
a memory that stores instructions; and
a processor configured to execute the instructions to perform processes of:
(I) in response to one or more private data related to a subject being acquired from a specific user of the user device, generating the specific tree, wherein the specific tree has leaf nodes to which each of private function values, created by applying its corresponding algorithm to each of the private data or their processed values, is allocated, wherein each private data of the one or more private data is the one or more private data to be registered in an open ledger of the blockchain without being opened to the public, and each of the one or more private data belongs to a set of private data that identifies the subject, and
(II) (i) (i-1) registering a representative value of the specific tree as a subject ID of the subject in the blockchain such that the representative value corresponds to the subject and (i-2) registering information on the specific tree as the subject ID of the subject in the blockchain such that the information on the specific tree corresponds to the subject, and (ii) supporting another device to perform one (ii-1) registering the representative value of the specific tree as the subject ID of the subject in the blockchain such that the representative value corresponds to the subject and (ii-2) registering the information on the specific tree as the subject ID of the subject in the blockchain such that the information on the specific tree corresponds to the subject, wherein
at the process of (1), the user device performs or supports another device to perform processes of generating one or more pseudo-public data including (i) one or more prefix values, corresponding to specific private data among the private data, which are one of (i-1) one or more representative private values of one or more specific ranges of the specific private data and (i-2) one or more reliability values of the specific private data, and (ii) a specific private value of the specific private data, registering the generated pseudo-public data as one or more sub-data corresponding to a sub-structure of a specific leaf node to which the specific private data is allocated, and allocating a pseudo-public function value created by applying the algorithm to the pseudo-public data to the specific leaf node.

10. The user device of claim 9, wherein the processor performs or supports another device to perform processes of generating prefix values, corresponding to the specific private data, determining the pseudo-public data of multi-levels including (i) the prefix values and (ii) the specific private function value of the specific private data, registering the pseudo-public data of multi-levels as the sub-data corresponding to the specific leaf node, and allocating a partial pseudo-public function value created by applying the algorithm to at least part of the pseudo-public data of multi-levels to the specific leaf node.

11. The user device of claim 10, wherein the pseudo-public data of lower levels covers at least one broader open range of the specific private data, and wherein the pseudo-public data of a specific level include (i) a specific prefix value corresponding to the specific level and (ii) a lower function value of the pseudo-public data of a level just below the specific level or the specific private function value of the specific private data.

12. The user device of claim 11, wherein the processor allocates or supports another device to allocate a top function value, created by applying the algorithm to the pseudo-public data of a highest level among the pseudo-public data of multi-levels, to the specific leaf node.

13. The user device of claim 9, wherein, at the process of (I), said their processed values are the pseudo-public data including (i) one or more prefix values, corresponding to specific private data among the private data, which is one of (i-1) one or more representative private values of one or more specific ranges of the specific private data and (i-2) one or more reliability values of the specific private data, and (ii) the specific private function value of the specific private data.

14. The user device of claim 9, wherein, at the process of (I),
(x1) the processor performs or supports another device to perform calculating at least one intermediate function value by applying the algorithm to the private function values allocated to sibling nodes neighboring with each other among nodes, of the specific tree, to which the private function values are allocated, and allocating the intermediate function value to a parent node of the sibling nodes,
(x2) the processor determines or supports another device to determine, if the parent node is a representative node of the specific tree, the intermediate function value allocated to the parent node as a representative value of the specific tree, and
(x3) the processor performs or supports another device to perform (x1) to (x2) repeatedly, if the parent node is not the representative node of the specific tree, by treating the parent node as one of the sibling nodes.

15. The user device of claim 9, wherein, at the process of (I), the processor, if at least part of the leaf nodes do not have any private function values allocated thereto, allocates or supports another device to allocate one or more certain function values to said at least part of the leaf nodes.

16. A service-providing server for information management using at a specific tree based on a blockchain, comprising:
a memory that stores instructions, and
a processor configured to execute the instructions to perform processes of:
(I) on condition that a specific tree for reference has been generated and information on the specific tree for reference has been registered as a subject ID of a subject in the blockchain such that the information on the specific tree for reference corresponds to the subject, wherein the specific tree for reference has leaf nodes to which each of private function values, created by applying its corresponding algorithm to each of one or more private data related to the subject or their processed values, is allocated, if in response to specific private data among the private data being-acquired from a user device, acquiring the information on the specific tree for reference stored in the blockchain as corresponding to the subject, wherein each private data of the one or more private data is to be registered in an open ledger of the blockchain without being opened to the public, and each of the one or more private data belongs to a set of private data that identifies the subject; and
(II) allocating a specific private function value, created by applying the algorithm to the specific private data or their processed values, to a specific leaf node at a location corresponding to the specific private data by referring to the information on the specific tree for reference, to thereby generate a specific tree for comparison, and determining whether the specific private data acquired from the user device is forged by comparing a representative value of the specific tree for comparison and a representative value in the information on the specific tree for reference acquired from the blockchain, wherein the processes further comprising
generating one or more pseudo-public data including (i) one or more prefix values, corresponding to specific private data among the private data, which are one of (i-1) one or more representative private values of one or more specific ranges of the specific private data and (i-2) one or more reliability values of the specific private data, and (ii) a specific private value of the specific private data,
registering the generated pseudo-public data as one or more sub-data corresponding to a sub-structure of a specific leaf node to which the specific private data is allocated, and
allocating a pseudo-public function value created by applying the algorithm to the pseudo-public data to the specific leaf node.

* * * * *